Figure 1:
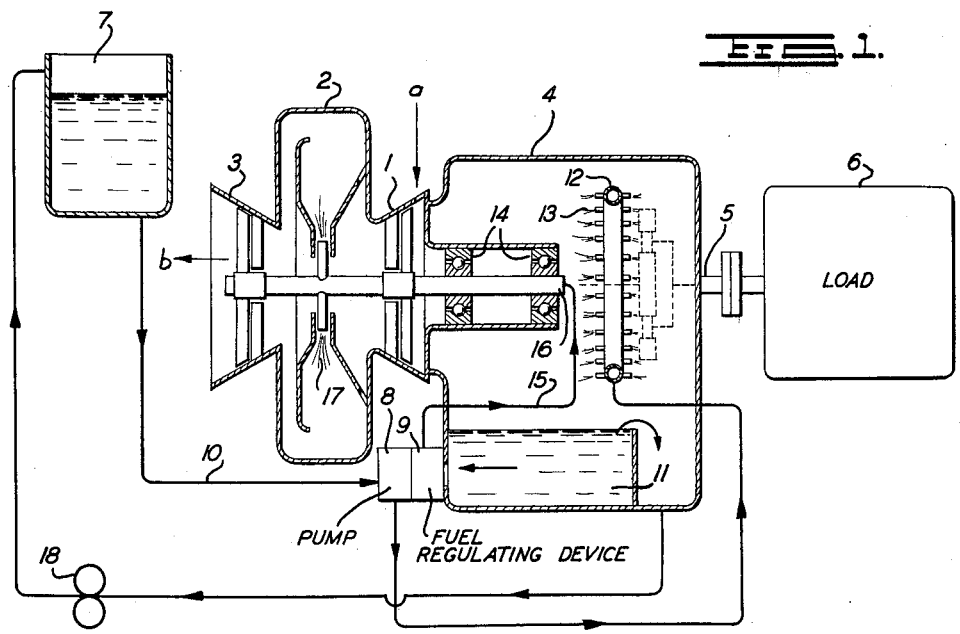

Feb. 26, 1963  H. DEINHARDT  3,078,667
COMBINED FUEL AND LUBRICATION SYSTEM FOR A GAS TURBINE ENGINE
Filed March 15, 1960  2 Sheets-Sheet 1

INVENTOR
HANS DEINHARDT

BY *Dickey, Craig & Freudenberg*
ATTORNEYS

Feb. 26, 1963 H. DEINHARDT 3,078,667
COMBINED FUEL AND LUBRICATION SYSTEM FOR A GAS TURBINE ENGINE
Filed March 15, 1960 2 Sheets-Sheet 2

INVENTOR
HANS DEINHARDT

BY *Dicke, Craig & Freudenberg*
ATTORNEYS 3,078,667
COMBINED FUEL AND LUBRICATION SYSTEM
FOR A GAS TURBINE ENGINE
Hans Deinhardt, Munich, Germany, assignor to BMW
Triebwerkbau Gesellschaft m.b.H., Munich-Allach,
Germany
Filed Mar. 15, 1960, Ser. No. 15,168
Claims priority, application Germany Mar. 28, 1959
4 Claims. (Cl. 60—39.08)

The present invention relates to gas turbines, especially small gas turbines, provided with a change speed transmission between the turbine shaft and the mechanical output or load. Gas turbines of this type entail, inter alia, the advantage over a piston-type engine of insensitivity as regards the fuel eventually utilized for combustion and the immediate operating readiness independent of ambient or prevailing temperatures. Furthermore, the relatively low maintenance costs and the relatively small working hours required in connection with upkeep and maintenance of gas turbines also have to be mentioned as among these advantages. For these reasons, relatively small gas turbines are particularly suited for the assembly of portable aggregates or units, for example, for emergency electrical generating units or fire extinguishing pumps.

In order to maintain the further advantages such as relatively slight weight per horsepower and relatively small dimensions, gas turbines of this type have to be operated at relatively high rotational speeds, thereby requiring, however, in practically all applications a change-speed reduction gear between the turbine shaft and the output shaft or mechanical load shaft. Depending on the type of construction losses occur in the change-speed transmission which are normally reduced or minimized as much as possible by means of lubrication. Additionally, the heating of the various structural parts caused by these losses is kept within permissive limits by appropriate cooling thereof. In the prior art devices, a lubricating oil has been used heretofore for purposes of cooling and lubricating which is normally supplied by means of a pump within a circulatory system of its own to the bearing places to be cooled and lubricated. The heat absorbed by the lubricating oil has to be released either over the transmission housing or through a separate oil cooler to the ambient air or to the cooling water of the installation.

The operation of gas turbines with a separate lubricating oil circulatory system and removal of heat by means of an oil cooler, however, has to be considered disadvantageous in particular with small portable units or aggregates as in that case large requirements occur with respect to maintenance of the apparatus and sufficient supply thereof with operating media.

The present invention avoids these disadvantages encountered with the prior art devices by utilizing the fuel required for the operation of the gas turbines simultaneously for purposes of cooling and lubricating of turbine and change-speed transmission whereby the fuel is supplied to the combustion chamber for purposes of combustion only after absorption of the heat derived from the losses within the turbines and the change-speed transmission.

If the circulatory system for the fuel is so arranged that the amount of fuel used in connection with cooling and lubricating of the bearings and change-speed transmission gear-wheels is larger, equal or smaller than the quantity required for combustion, then the entire amount or part of the thermal losses occurring in the bearings etc. is resupplied or returned to the gas turbine operation. Consequently, in addition to the advantages of a simple construction with only a single operating medium, an improved thermal efficiency is an additional advantage obtainable in accordance with the present invention.

Furthermore, according to the present invention, the change-speed transmission housing is in communication with the suction side of the compressor so that the fuel discharged within the transmission housing by means of appropriate nozzles and serving for purposes of cooling the parts thereof is guided and therewith is automatically supplied by the suction effect through the bearing places of the transmission and of the turbine. The supply of the fuel from the fuel tank to the nozzles within the transmission housing may take place with the aid of the compressor pressure in order to save a separate fuel supply pump which compressor pressure is made available at a suitable pressure by being branched off from the compressor at an appropriate place.

A further advantageous construction may be obtained in accordance with the present invention if the transmission housing and the fuel tank or reservoir form a common housing whereby the fuel tank space is so located and arranged that the fuel draining out of the lubricating and cooling places, i.e., the places to be lubricated and/or cooled, flows back to the fuel tank without the interposition of a supply device, such as a pump. For that purpose, a collecting tank is appropriately provided in the sump of the transmission housing above the fuel tank from which is taken the fuel intended for purposes of combustion within the turbine, and which is in communication with the fuel tank by appropriate overflow means.

Accordingly, it is an object of the present invention to provide a gas turbine system which obviates the disadvantages encountered with the prior art devices and which permits a more compact construction and design than has been possible heretofore in the prior art devices.

Another object of the present invention is the provision of a gas turbine installation, especially a small portable or semi-portable gas turbine installation in which lubrication and cooling of the various parts is rendered feasible in a particularly appropriate and efficient manner.

Still another object of the present invention is the provision of a gas turbine installation in which only only one operating medium is required, namely the fuel for the turbine to perform the cooling and lubricating functions in addition to serving as combustion medium.

Another object of the present invention is the provision of a cooling and lubricating system for a gas turbine unit which increases the overall efficiency of the unit by returning at least in part to the turbine operation the thermal losses produced in the bearing places and change-speed transmission, the latter being necessitated between the turbine shaft and the load shaft by reason of the relatively high rotational speed of operation of the turbine rotor required for efficient operation of the turbine.

Another object of the present invention resides in the provision of a small gas turbine installation in which the turbine may be operated at high efficiency by the use of a lubricated and cooled change-speed gear between the turbine shaft and the load shaft to reduce the high rotary speed of the turbine shaft required for efficient operation thereof to the relatively lower rotational speed of the normal load such as a generator, a pump or the like.

A further object of the present invention resides in the provision of a compact gas turbine unit in which no separate supply pumps are required for supplying the fuel to the various places which necessitate cooling and/or lubrication.

Figure 2:
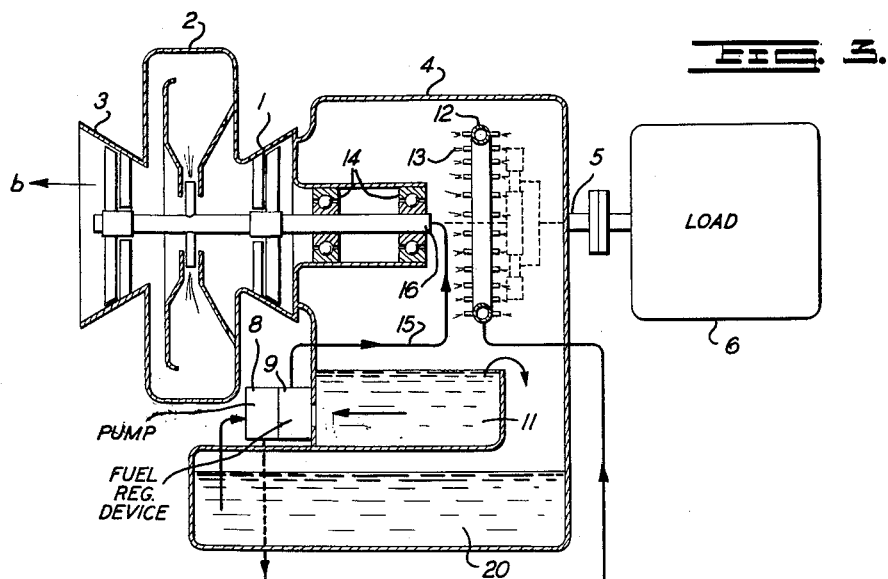
Figure 2:
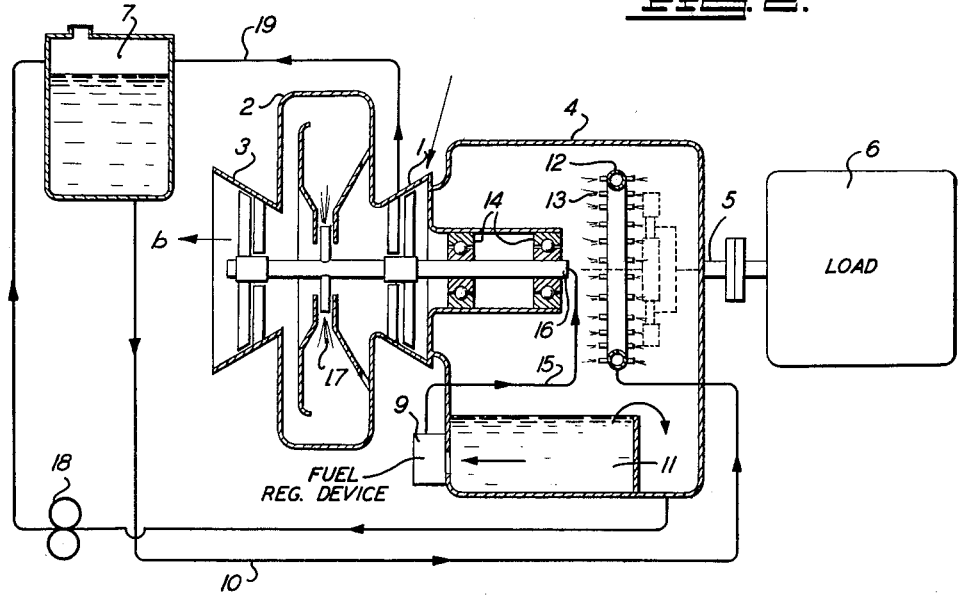

These as well as further objects, features and advantages of the present invention will become more obvious from the following description when taken in connection with the accompanying drawing which shows in the various views thereof, for purposes of illustration only, several embodiments in accordance with the present invention and wherein:

FIGURE 1 is a schematic view of a first embodiment of a gas turbine unit in accordance with the present invention, FIGURE 2 is a schematic view of a modified embodiment of a gas turbine unit in accordance with the present invention, and FIGURE 3 is a schematic view of still a further modified embodiment in accordance with the present invention.

Referring now to the drawing wherein like reference numerals are used throughout the various views to designate like parts, and more particularly to FIGURE 1, the gas turbine unit illustrated therein is utilized to drive a load 6, for example, a generator. The aggregate or unit of the gas turbine consists essentially of a compressor 1 into which the suction air flows in the direction of arrow $a$, of an annular combustion chamber 2 with rotary atomization for the fuel to be injected, and of a turbine 3 having a discharge of the combustion gases in the direction of arrow $b$. A change-speed gear housing 4 containing suitable gear mechanisms for purposes of reducing the rotational speed of the turbine shaft is flangedly connected to the compressor housing. The load or output 6 which may be any suitable device is operatively connected with the output shaft 5 of the change-speed gear. The compressor 1, the annular combustion chamber 2 and rotary atomizer, the turbine 3 as well as the change-speed gear housing 4 and load may be of any suitable known construction appropriate for the intended purposes.

The fuel tank 7 is arranged separate from the gas turbine aggregate or unit in such a manner that the fuel flows freely, preferably by gravitational forces, to an installation which consists of a cooling and/or lubricating pump 8 and of a fuel regulating device 9 regulating the quantity of fuel to be supplied to the combustion chamber which again may be of any suitable known construction. The fuel flows to this installation 8, 9 from the tank 7 in such a manner that the lubricating pump 8 is supplied from the fuel tank 7 over a line 10 whereas the fuel intended for combustion flows to the fuel regulating device 9 from the sump 11 of the change-speed gear housing 4.

The fuel derived from the fuel tank 7 is supplied, by means of lubricating pump 8, to a distributor line 12 within the change-speed housing 4, indicated only schematically in the drawing, and is discharged by means of nozzles 13 of any suitable construction and arrangement and located at appropriate places within the change-speed gear housing 4 in such a manner that the fuel mist discharged from nozzles 13 impinges on those transmission parts intended to be cooled and also reaches, with the aid of the suction produced by the compressor 1, the bearing places 14 to be lubricated so as to finally reach the combustion chamber 2 together with the suction air of the compressor 1. The arrangement and construction of the turbine-compressor shaft and of the fuel supply to the combustion chamber 2 through the rotary atomizer may be of any suitable construction known in the prior art or may be, for example, as disclosed in the copending application Ser. No. 15,180, entitled "Fuel Supply System For Gas Turbines" filed on March 15, 1960, now Patent No. 3,021,675, in the name of Hans-Joachim Schroeder, and assigned to the assignee of the above-identified application. It is also understood that the arrangement of the nozzles 13 in the drawing is schematic only for purposes of illustration and is not to be considered as a limitation of the actual arrangement thereof which may be varied at will to suit the particular construction and needs thereof.

The fuel condensed within the transmission housing 4 collects in the sump 11 thereof and is supplied by the fuel regulating member 9, in dependence on the required output of the gas turbine, over line 15 to the gas turbine shaft 16 constructed in a hollow manner as disclosed, for example, in said copending application; the fuel is centrifugally thrown out of the hollow turbine shaft into the combustion chamber 2 by means of a rotary atomizer disk 17 which also may be of any suitable construction. The excess fuel is returned to the fuel tank 7 from the overflow of sump 11 by means of fuel supply pump 18.

FIGURE 2 illustrates a modified embodiment of the gas turbine unit illustrated in FIGURE 1. In the embodiment of FIGURE 2, the fuel tank 7 is constructed as a pressure tank and for that purpose is operatively connected over line 19 with a predetermined point of the pressure side of compressor 1. In the embodiment of FIGURE 2 the need for a separate cooling and/or lubricating pump, such as pump 8 of FIGURE 1 is dispensed with. The fuel in the embodiment according to FIGURE 2 flows into the cooling medium distributor 12 under the pressure produced by the compressor 1. This pressure may, if so desired, be adjusted by means of a suitable reducing valve. Otherwise the operation of the gas turbine unit of FIGURE 2 is analogous to that of FIGURE 1.

In FIGURE 3, the fuel tank 20 is constructed as pedestal for the transmission housing 4 or forms a part thereof. The excess fuel of sump 11 flows directly into the fuel tank 20 and thereby eliminates the requirement for a separate fuel supply pump or return pump 18 as used in the embodiment of FIGURES 1 and 2. Otherwise, the operation of the gas turbine unit of FIGURE 3 is similar to that of FIGURE 1.

It should be noted that in all of the three embodiments, the fuel for the annular combustion chamber supplied over fuel regulating member 9 is taken from the sump 11 in which collects the fuel after absorbing the heat produced in the change-speed gear and bearing places of the unit. Consequently, the fuel supplied by means of adjusting or regulating member 9, line 15 through hollow shaft 16 and discharged centrifugally into the combustion chamber 2 by atomizer disk is effectively preheated and thereby returns in the form of the preheated fuel some of the energy which otherwise would be lost within the unit in the form of thermal losses.

While I have shown and described three embodiments in accordance with the present invention it is understood that the present invention is not limited thereto but is susceptible of many changes and modifications within the spirit and scope of the present invention. For example, it is understood that the present invention is not limited in its application to the small gas turbine units mentioned herein but may also be used for other purposes with the same advantages, for example, for airplane drive units.

Consequently, I do not wish to be limited to the particular details shown and described herein, but intend to cover all such changes and modifications as are encompassed by the scope of the appended claims.

I claim:

1. A gas turbine unit provided with a reduction gear between a turbine shaft and a load shaft, comprising gas turbine means including a turbine shaft provided with bearing means, compressor operatively connected to said gas turbine means, output means, change-speed gear means operatively connecting said turbine shaft with said output means, said change-speed gear means being provided with a gear housing in communication with the suction side of said compressor means, fuel supply means for supplying fuel to said gas turbine means while simultaneously cooling and lubricating said turbine shaft, said bearing means and said change-speed gear means, said fuel supply means including nozzle means distributing a spray of fuel to provide said cooling and lubricating functions, a fuel tank forming a common housing with said change-speed gear housing, sump means within said common housing for collecting the fuel draining out of the cooling and lubricating places, said sump means being operatively connected with said fuel tank by overflow means connecting said sump means with said fuel tank in such a manner that the fuel flows from said sump means into said fuel tank by gravitational forces, and said fuel supply means including means taking the fuel collecting in said sump means for supplying the same to said gas turbine means.

2. A gas turbine unit, especially a small gas turbine provided with a reduction gear between the turbine shaft and the load shaft comprising gas turbine means including turbine means having a turbine shaft, compressor means operatively connected to said turbine means, output means, change-speed gear means including a change-speed gear housing and operatively connecting said turbine shaft with said output means, bearing means operatively associated with said turbine shaft and said change-speed gear means, fuel supply means for supplying fuel to said turbine means including nozzle means for cooling and lubricating said turbine shaft and said change-speed gear means by the fuel to be used in said turbine means, said fuel supply means being operative to supply fuel to said turbine means only after absorption of some of the heat caused by the losses in said turbine means and said change-speed gear means, said gear housing being in communication with the suction side of the compressor, whereby said nozzle means discharge a fuel mist within said housing in such a manner that a part of said fuel mist is drawn through bearing means by the suction produced by said compressor means at the suction side thereof, fuel tank means forming a common housing with said change-speed gear housing, said fuel tank means being so arranged that the fuel draining from the lubricating and bearing places may drain into said fuel tank means by gravitational forces, sump means within said change-speed gear housing, and overflow passage means placing said sump means in communication with said fuel tank means, the fuel to be supplied to said turbine means being derived by said fuel supply means from said sump means.

3. A gas turbine unit, especially a small gas turbine provided with a reduction gear between the turbine shaft and the load shaft comprising gas turbine means including turbine means having a turbine shaft, compressor means operatively connected to said turbine means, output means, change-speed gear means including a change-speed gear housing and operatively connecting said turbine shaft with said output means, bearing means operatively associated with said turbine shaft and said change-speed gear means, fuel supply means for supplying fuel to said turbine means including nozzle means for cooling and lubricating said turbine shaft and said change-speed gear means by the fuel to be used in said turbine means, said fuel supply means being operative to supply fuel to said turbine means only after absorption of some of the heat caused by the losses in said turbine means and said change-speed gear means, sump means within said change-speed gear housing, fuel tank means, said fuel tank means forming a common housing with said first mentioned housing, said fuel tank means being so arranged that the fuel draining into said sump means from the places to be lubricated and cooled by the fuel may drain off by gravity, overflow passage means operatively connecting said sump means with said fuel tank means, and means in said fuel supply means for taking the fuel to be supplied to said turbine means from said sump means.

4. A gas turbine unit provided with a reduction gear between a turbine shaft and a load shaft, comprising gas turbine means including a turbine shaft provided with bearing means, compressor means operatively connected to said turbine means, output means change-speed gear means operatively connecting said turbine shaft with said output means, and fuel supply means for supplying fuel to said turbine means while simultaneously cooling and lubricating said turbine shaft, said bearing means and said change-speed gear means, sump means within said change-speed gear means, a fuel tank, means operatively connecting said sump means with said fuel supply means whereby the fuel is received from said sump means, said fuel supply means including nozzle means distributing a spray of fuel to provide said cooling and lubricating functions, and overflow means operatively connecting said sump means with said fuel tank to return excess fuel to said fuel tank.

References Cited in the file of this patent

UNITED STATES PATENTS

| | | |
|---|---|---|
| 1,346,509 | Olhovsky | July 13, 1920 |
| 2,066,452 | Bernard | Jan. 5, 1937 |
| 2,634,577 | Halford et al. | Apr. 14, 1953 |
| 2,676,458 | Hill | Apr. 27, 1954 |
| 2,748,568 | Budworth | June 5, 1956 |
| 2,933,886 | Sharma | Apr. 26, 1960 |
| 2,969,879 | Belcher | Jan. 1, 1961 |

FOREIGN PATENTS

| | | |
|---|---|---|
| 792,405 | France | Oct. 21, 1935 |